US009774400B2

(12) United States Patent
Mitra et al.

(10) Patent No.: US 9,774,400 B2
(45) Date of Patent: Sep. 26, 2017

(54) METHOD AND APPARATUS FOR LOW-COMPLEXITY QUASI-REDUCED STATE SOFT-OUTPUT EQUALIZER

(71) Applicant: Huawei Technologies Co., Ltd., Shenzhen (CN)

(72) Inventors: Jeebak Mitra, Ottawa (CA); Zhuhong Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/184,815

(22) Filed: Jun. 16, 2016

(65) Prior Publication Data
US 2017/0012712 A1 Jan. 12, 2017

Related U.S. Application Data

(62) Division of application No. 14/795,636, filed on Jul. 9, 2015, now Pat. No. 9,385,896.

(51) Int. Cl.
*H04L 25/03* (2006.01)
*H04B 10/61* (2013.01)
*H04B 10/2513* (2013.01)

(52) U.S. Cl.
CPC ... *H04B 10/6161* (2013.01); *H04B 10/25133* (2013.01); *H04L 25/03197* (2013.01); *H04L 25/03203* (2013.01)

(58) Field of Classification Search
CPC .......... H04B 10/6161; H04B 10/25133; H04L 25/03197; H04L 25/03203
See application file for complete search history.

(56) References Cited

U.S. PATENT DOCUMENTS

| 8,098,775 | B2 | 1/2012 | Yokokawa et al. |
| 8,345,784 | B2 | 1/2013 | Khayrallah |
| 2009/0060079 | A1 | 3/2009 | Choi et al. |
| 2009/0235060 | A1 | 9/2009 | Yokokawa et al. |
| 2010/0309796 | A1 | 12/2010 | Khayrallah |

(Continued)

FOREIGN PATENT DOCUMENTS

CN 102461107 A 5/2012

OTHER PUBLICATIONS

Staggered Trellis Coded Modulation—Axel Hof, Martin Bossert—University of Ulm, Dept. of Telecommunication and Applied Information Theory (TAIT)—Apr. 3-7, 2006, Munich.*

(Continued)

*Primary Examiner* — Dac Ha
(74) *Attorney, Agent, or Firm* — Slater Matsil, LLP

(57) ABSTRACT

Quasi-reduced state trellis equalization techniques achieve low-latency inter-symbol interference (ISI) equalization by selecting a subset of accumulated path metrics (APMs) for a leading symbol to propagate over a trellis to candidate states of a trailing symbol. This simplifies the computation of APMs for candidate states of the trailing symbol. Thereafter, APMs for candidate states of the trailing symbol are computed based on the subset of APMs for the leading symbol that were propagated over the trellis. Propagating fewer than all APMs for the leading symbol to the trailing symbol reduces the complexity of APM computation at the trailing symbol.

20 Claims, 10 Drawing Sheets

(56) References Cited

U.S. PATENT DOCUMENTS

2011/0069791 A1* 3/2011 He .................. H03M 13/3723
  375/341
2012/0051470 A1  3/2012 Schlegel et al.
2013/0034054 A1* 2/2013 Wu .................... H04L 27/2607
  370/328

OTHER PUBLICATIONS

Eyuboglu, M. V., et al., "Reduced-state sequence estimation with set partitioning and decision feedback," IEEE Transactions on Communications, vol. 36, No. 1, pp. 13-20, Jan. 1988.

Hagenauer, J., et al., "A Viterbi algorithm with soft-decision outputs and its applications," IEEE Global Telecommunications Conference and Exhibition 'Communications Technology for the 1990s and Beyond' (GLOBECOM), vol. 3, Nov. 27-30, 1989, pp. 27-30.

Muller, S.H., et al., "Reduced-state soft-output trellis-equalization incorporating soft feedback," GLOBECOM '96 Global Telecommunications Conference, Communications: The Key to Global Prosperity, vol. 1, Nov. 18-22, 1996, pp. 95-100.

Sun, F., et al., "Quasi-Reduced-State Soft-Output Viterbi Detector for Magnetic Recording Read Channel," IEEE Transactions on Magnetics, vol. 43, No. 10, Oct. 2007, pp. 3921-3924.

* cited by examiner

METHOD AND APPARATUS FOR LOW-COMPLEXITY QUASI-REDUCED STATE SOFT-OUTPUT EQUALIZER

This patent application is a divisional application of U.S. Non-Provisional application Ser. No. 14/795,636, filed on Jul. 9, 2015 and entitled "Method and Apparatus for Low-Complexity Quasi-Reduced State Soft-Output Equalizer," which is hereby incorporated by reference herein as if reproduced in its entirety.

TECHNICAL FIELD

The present invention relates generally to reducing interference in a communications network, and in particular embodiments, to techniques and mechanisms for a method and apparatus for low-complexity quasi-reduced state soft-output equalizer.

BACKGROUND

Higher symbol (baud) rates are likely to be implemented in next-generation networks to provide data rates in excess of 100 Gigabits per second (Gbps) over relatively long distances, e.g., 500 kilometers or more. Some network components may be unable to support such high symbol rates without introducing significant distortion into the signal. One form of signal distortion is inter-symbol interference (ISI), which occurs when leading symbols interfere with trailing symbols. ISI typically results when a signal is communicated over a dispersive channel, which causes individual pulses of symbols in the signal to appear smeared and/or broadened upon reception. The source of ISI is largely medium dependent. In wireless channels, ISI is primarily attributable to multipath propagation, which occurs when the wireless signal traverses multiple paths between the transmitter and receiver. In optical channels, ISI is primarily attributable to chromatic dispersion, which occurs when light traveling through the fiber exhibits different speeds at different wavelengths. Additionally, ISI may be attributable to the bandlimited nature of optical frontends and various network elements (e.g., wavelength selective switches (WSS). Excessive ISI can introduce errors into signal decoding at the receiver. Therefore, techniques for reducing ISI in high baud rate networks are desired.

SUMMARY OF THE INVENTION

Technical advantages are generally achieved by embodiments of this disclosure which describe a method and apparatus for low-complexity quasi-reduced state soft-output equalizer.

In accordance with an embodiment, a method for performing trellis equalization on a sequence of modulated symbols with state reduction is provided. In this example, the method includes computing APMs for candidate states of a leading symbol, and selecting a subset of the APMs for candidate states of the leading symbol to propagate over a trellis to candidate states of a trailing symbol. The leading symbol precedes the trailing symbol in the sequence of symbols. The method further includes computing APMs for candidate states of the trailing symbol using APMs in the subset of APMs selected to propagate over the trellis without using APMs for candidate states of the leading symbol that are not propagated over the trellis, and decoding the sequence of symbols in accordance with at least some of the APMs computed for the candidate states of the trailing symbol. An apparatus for performing this method is also provided.

In accordance with another embodiment, a method for staggered processing of modulated symbols is provided. In this example, the method includes dividing a sequence of modulated symbols into a sequence of blocks that includes a leading block immediately preceding a trailing block, and processing, via parallel processors, a set of staggered blocks during a first period. The set of staggered blocks includes the leading block but excludes the trailing block. The method further comprises processing, via a first processor in the parallel processors, the trailing block during a second period. An apparatus for performing this method is also provided.

BRIEF DESCRIPTION OF THE DRAWINGS

For a more complete understanding of the present disclosure, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
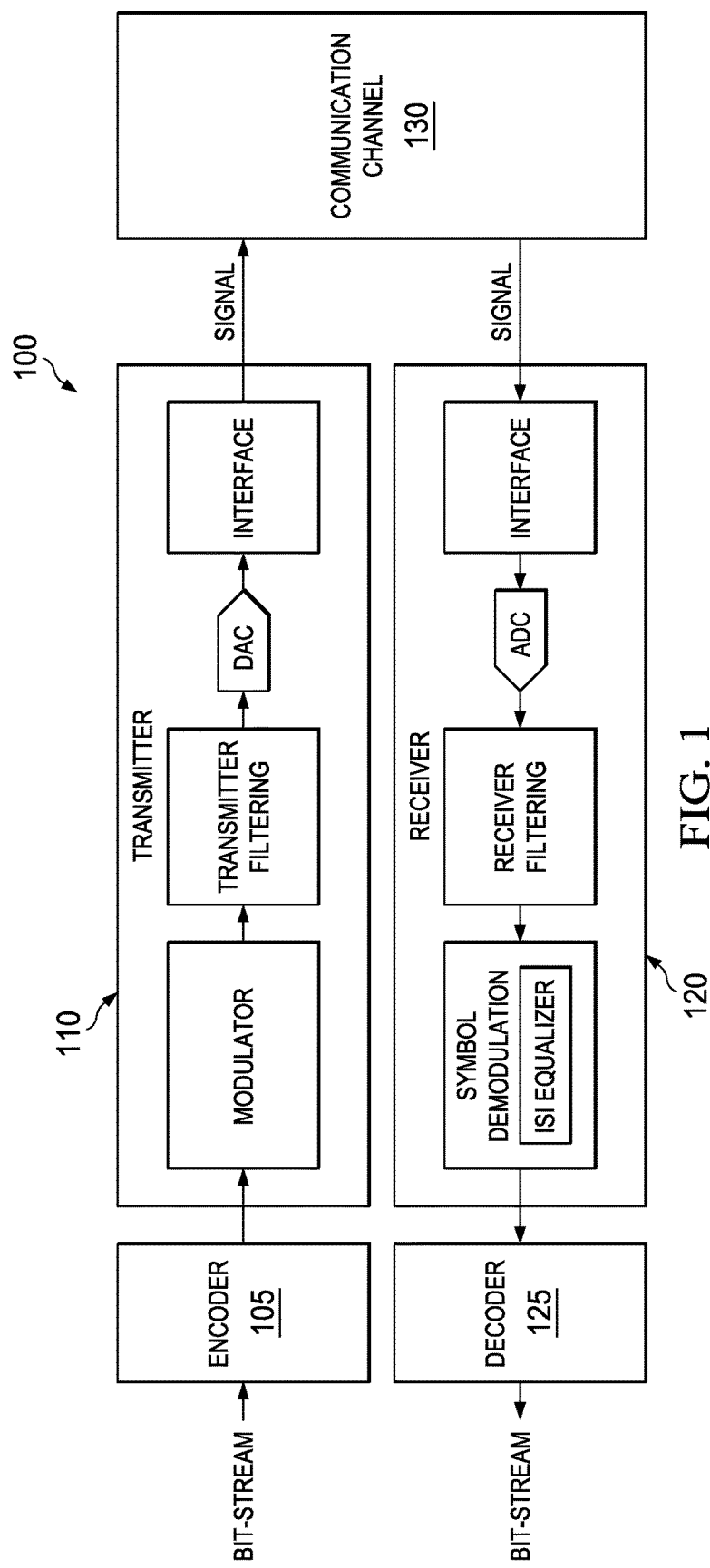
FIG. 1 illustrates a diagram of a communications system.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. As discussed herein, the terms "leading symbol" and "trailing symbol" denote the relative position of the referenced symbols in the corresponding sequence of symbols. Thus, a given symbol (k) is a trailing symbol in reference to symbols (k−1, k−2 . . . k−n) positioned ahead of the given symbol (k) in the sequence of symbols. Likewise, the given symbol (k) is a leading symbol in reference to symbols (k+1, k+2 . . . k+n) positioned after the given symbol (k) in the sequence of symbols.

Equalization techniques may be used to reduce the effect of ISI in a signal. The complexity of ISI equalization is dependent on the memory exhibited by the channel and the size of the constellation being used to modulate the symbols. Channel memory generally refers to the number of leading symbols that affect a given trailing symbol. For example, a trailing symbol (k) communicated over a channel exhibiting two symbols of channel memory will likely experience ISI from two leading symbols, symbols, namely symbol (k−1) and symbol (k−2). Accordingly, ISI equalization may need to account for ISI from a higher number of symbols in channels having a higher channel memory, thereby increasing the complexity of the ISI equalization. Likewise, ISI equalization for higher order modulation symbols (e.g., 64 quadrature amplitude modulation (QAM) symbols) generally has higher computational complexity than ISI equalization for symbols modulated using a lower order constellation.

Other factors may further increase the complexity of ISI equalization. For example, some bit-level decoding techniques require soft-output information to be generated during symbol level decoding. Indeed, many forward error correction (FEC) coding techniques utilize soft information (e.g., log likelihood ratios (LLRs)) as an input for bit-level decoding to reduce bit error rates and achieve high net coding gains. Conventional techniques for obtaining soft-output information use Maximum A Posteriori (MAP) style decoding schemes, e.g., MAP, log MAP, max-log MAP. However, MAP style decoding schemes typically require backward recursion, which increases latency in the digital signal processing (DSP) pipeline, and may be too complex for higher order modulation symbols at data rates of 100 Gbps or more. Accordingly, less complex symbol decoding techniques that produce soft-outputs for bit-level decoding without requiring backward recursion are desired to support high symbol rates in next generation networks.

Aspects of this invention provide quasi-reduced state trellis equalization techniques that achieve low-latency ISI equalization during symbol-level decoding, while still producing high quality soft-outputs for bit-level decoding. In an embodiment method, an equalizer computes accumulated path metrics (APMs) for each candidate state of a leading symbol, and then dynamically selects a subset of the APMs of the leading symbol to be propagated over a trellis to candidate states of a trailing symbol. The APMs may be computed based on branch metrics (BMs) of the leading symbol, as well as APMs of earlier symbols. Thereafter, the equalizer computes APMs for candidate states of the trailing symbol based on the subset of APMs of the leading symbol that were propagated over the trellis. The equalizer then decodes the sequence of symbols using at least some APMs for candidate states of the trailing symbol. This may include additional stages of BM/APM computations prior to selection of a best path over the trellis.

Notably, the subset of APMs selected for propagation over the trellis may be stored in memory so that they can be used to compute log likelihood ratios (LLRs) during bit-level decoding. In some embodiments, APMs for the leading symbol that are excluded from the subset of APMs (i.e., not selected for propagation over the trellis) are discarded. This may reduce the memory storage requirements of the equalizer. In such embodiments, the BMs computed for the leading symbol may be stored in memory so that they can be used in the event that a degenerate LLR condition occurs when decoding one or more bits in the leading symbol. A degenerate LLR condition occurs when all APMs in the subset of APMs map to the same value (zero or one) for a given bit. In one example, the degenerate LLR condition occurs when all APMs in the subset of APMs map to a value of one for a bit in the leading symbol such that no APMs in the subset of APMs map to a value of zero for that bit. In another example, the degenerate LLR condition occurs when all APMs in the subset of APMs map to a value of zero for a bit in the leading symbol such that no APMs in the subset of APMs map to a value of one for that bit. When a degenerate LLR condition occurs, the BMs stored in memory are used to compute a soft-output (e.g., LLR) for the corresponding bit in the leading symbol. Thus, storing the BMs in memory allows for LLR computation even when the computed APMs produce a degenerate LLR condition.

Aspects of this invention further provide embodiment staggered parallel processing schemes for performing ISI equalization on blocks of modulation symbols. The embodiment staggered parallel processing schemes reduce processing overhead and latency when compared to conventional parallel processing schemes. More specifically, ISI equalization typically requires the processor to evaluate one or more leading symbols (e.g., k leading symbols) in order to remove ISI from a trailing symbol (where k depends on channel memory). During parallel processing, a sequence of modulation symbols is broken into N blocks of modulation symbols (N is an integer greater than 1), and the N blocks are processed by parallel processors over a sequence of periods.

Conventional techniques process the N blocks sequentially. For instance, if four blocks are processed by two processors (processor 1 and processor 2) at a rate of one block per processor per period, then block one and block two would be processed by processor 1 and processor 2 (respectively) during a first period, and block three and block four would be processed by processor 1 and processor 2 (respectively) during a second period. Notably, at the beginning of the second period, processor 2 would not have knowledge of the values of the last few symbols of the block (i.e., block three) preceding the current block (i.e., block four), as those symbols would not be decoded by processor 1 until the end of the second period. In conventional processing schemes, processor 2 addresses this problem by processing the last few symbols (e.g., L symbols) of the preceding block (i.e., block three) at the beginning of a second period so that ISI equalization can be performed on the first few symbols of the current block (i.e., block four). This adds latency and processing overhead, as it requires the processing of additional symbols at the beginning of the period.

Aspects of this invention mitigate and/or avoid the aforementioned latency and processing overhead by processing the blocks in a staggered fashion. In the example described above, block one and block three would be processed by processor 1 and processor 2 (respectively) during the first period, and block two and block four would be processed by processor 1 and processor 2 (respectively) during the second period. As a result, processor 2 would already know the values for the last few symbols of block three at the beginning of the second period, and could therefore proceed to begin processing the first few symbols of block immediately upon initialization of the second period. This staggered processing scheme can be applied to any number of processors over any number of periods. These and other aspects are discussed in greater detail below.

FIG. 1 illustrates a diagram of a communications system 100 in which a signal is communicated from a transmitter no to a receiver 120 over a communication channel 130. As shown, an encoder 105 encodes a bit-stream, and forwards the encoded bit-stream to the transmitter no. The encoder 105 may use any type of encoding scheme, including a forward error correction (FEC) encoding scheme. The transmitter no then modulates the encoded bit-stream by mapping bits in the encoded bit stream to modulation symbols (e.g., QAM symbols, QPSK symbols), and performs additional signal processing steps (e.g., filtering, digital to analog conversion (DAC), amplification) to obtain a signal. The signal is then transmitted over the communication channel 130 to the receiver 120. The communication channel 130 may be any type of channel. In some embodiments, the communication channel 130 includes a wireless link/interface. In such embodiments, the transmitter no and the receiver 120 may communicate the signal in accordance with a wireless telecommunication protocol, such as long term evolution (LTE), Worldwide Interoperability for Microwave Access (WiMAX), or Wi-Fi telecommunications protocol. In other embodiments, the communication channel 130 includes a wireline link/interface, e.g., copper line, optical fiber.

Upon reception, the receiver 120 performs various processing steps on the signal (e.g., analog to digital conversion, filtering) prior to symbol demodulation. The de-modulated signal is then decoded at the decoder 125 to obtain a decoded bit-stream.

Notably, ISI equalization may be performed during, or after, symbol demodulation. Embodiments of this disclosure provide quasi-reduced state trellis equalization techniques that reduce the processing load and latency when compared to conventional MAP equalization. In some embodiments, soft-output information (e.g., LLRs) is produced during reduced state trellis equalization from accumulated path metrics (APMs), branch metrics (BMs), or combinations thereof. The soft-output information may be provided to the decoder 125, where it is used as an input parameter for hard decisions during bit-level decoding. The soft-output information may be generated using various techniques, such as a soft output Viterbi algorithm (SOVA) or Bahl-Cocke-Jelinek-Raviv (BCJR) algorithm. It should be appreciated that the receiver 120 may include other components, such as components that perform symbol timing synchronization and carrier phase estimation and correction prior to symbol demodulation.

Figure 2:
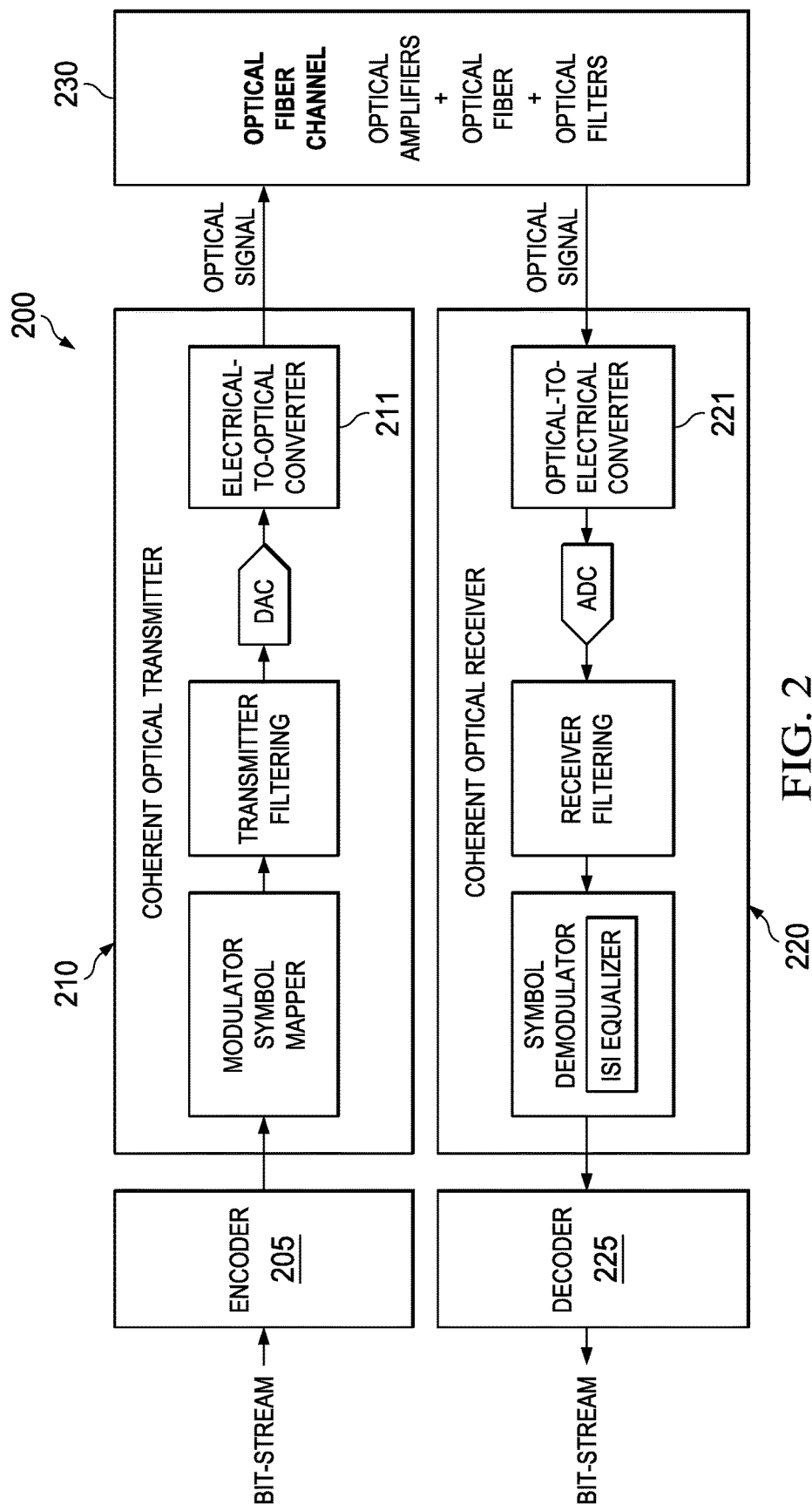
FIG. 2 illustrates a diagram of a coherent optical communications system.

Embodiment ISI equalization techniques described herein can be implemented in coherent optical networks. FIG. 2 illustrates a diagram of a coherent optical system 200 in which data is communicated from a coherent optical transmitter 210 to a coherent optical receiver 220 over an optical fiber channel 230. As shown, an encoder 205 encodes a bit-stream, and then forwards the encoded bit-stream to the coherent optical transmitter 210. The encoder 205 may be configured similarly to the encoder 105, and may use any type of encoding scheme, including forward error correction (FEC) encoding schemes. The coherent optical transmitter 210 then modulates the encoded bit-stream by mapping bits in the encoded bit stream to modulation symbols. The coherent optical transmitter 210 may also perform other signal processing steps (e.g., filtering, digital to analog conversion (DAC), amplification) prior to forwarding the signal to the electrical-to-optical converter 211. Although the electrical-to-optical converter 211 is depicted as being a component of the coherent optical transmitter 210, it should be appreciated that the electrical-to-optical converter 211 may be an independent component that is separate from the coherent optical transmitter 210 in some embodiments. The electrical-to-optical converter 211 may also be referred to as an optical-electrical front end.

The electrical-to-optical converter 211 converts the signal into an optical signal prior to the optical signal being transmitted over the optical fiber channel 230 to the coherent optical receiver 220. The coherent optical channel 230 includes various components, including optical amplifiers, optical fiber, and optical switches and filters. Components of the coherent optical channel 230 may introduce distortion into the optical signal, particularly when the coherent optical channel 230 is a bandwidth limited channel, e.g., a channel in which the frequency response is zero above a certain cutoff frequency.

Upon reception, the coherent optical receiver 220 converts the optical signal to an analog electrical signal at the optical-to-electrical converter 221. Similarly to the electrical-to-optical converter 211, the optical-to-electrical converter 221 may be an internal component of the coherent optical receiver 220, or an independent component that is separate from the coherent optical receiver 220. Thereafter, the coherent optical receiver 220 may perform various signal processing steps (e.g., analog to digital conversion, filtering) prior to symbol demodulation. ISI equalization may be performed during, or after, symbol demodulation using embodiment quasi-reduced state trellis equalization techniques provided by this disclosure. For example, the coherent optical receiver 220 may perform chromatic dispersion (CD) compensation and/or polarization mode dispersion (PMD) compensation prior to ISI equalization. Additionally, soft-output information (e.g., LLRs) may be produced, which may be provided to the decoder 225 as an input for producing hard decisions during bit-level decoding.

Figure 3:
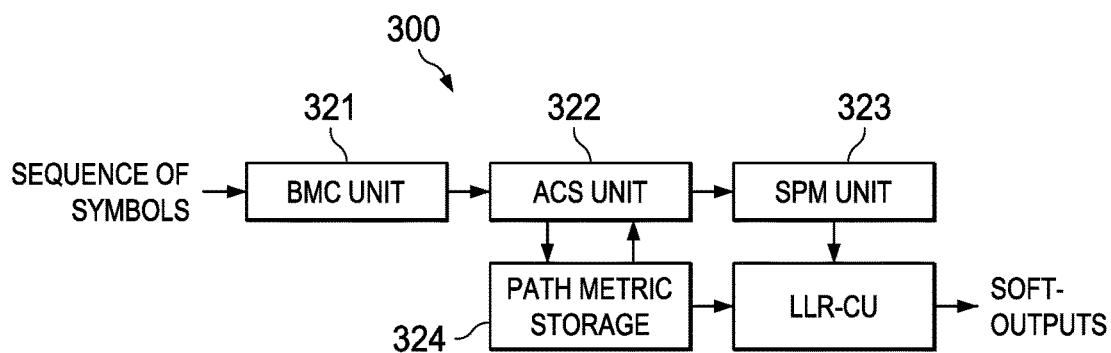
FIG. 3 illustrates a block diagram of an embodiment trellis equalizer.

FIG. 3 illustrates a block diagram of a trellis equalizer 300. As shown, the trellis equalizer 300 includes a branch metric computation (BMC) unit 321, an add compare select (ACS) unit 322, a survivor path management (SPM) unit 323, a path metric storage unit 234, and an LLR computation unit (LLR-CU) 325. The BMC unit 321 computes branch metrics (BMs) for candidate states of symbols in a sequence of symbols. The ACS unit 322 computes accumulated path metrics (APMs) for each candidate symbol based on the BMs of that symbol, and (if available) APMs of preceding/leading symbols. The ACS unit 322 then stores the APMs in the path metric storage 324, and provides the APMs to the SPM unit 323. The SPM unit 323 uses the APMs to select the most likely path, which maps each symbol in the sequence of symbols to a most likely current state for that symbol. In some embodiments, the symbols are Quadrature Phase Shift Keying (QPSK) symbols. In other embodiments, the symbols are QAM symbols. In yet other embodiments, the signal carrying QAM or QPSK symbols is filtered prior to demodulation in such a manner that the symbols no longer exhibit characteristics of QPSK or QAM symbols. In such embodiments, filtering of the signal prior to modulation may prepare the signal for reduced state detection and/or increase the likelihood that the input signal to the trellis equalizer 300 is a minimum phase signal.

The ACS unit 322 may obtain the APMs for candidate states of a current symbol by adding APMs of candidate states of a preceding symbol (APM($s_{k-1}$)) to the branch metrics of the candidate states of the current symbol (BM ($s_k$)), where $s_k$ denotes a current stage of the trellis. The APMs may then be evaluated to identify which candidate state most likely represents the actual state of the current symbol. Typically, the candidate state having the smallest APM is identified as being most likely to represent the actual state of the propagated maximum likelihood path at that time epoch or sampling instant. A BM may be a Euclidean distance, or a similar type of metric, e.g., an L1 norm vector. The candidate state identified as being most likely to represent the actual state of the current symbol is then added to a state history list of the current path, and stored in the SPM unit 323. The SPM 323 may store the state history list and the survivor path history for each of the trellis states, as well as branch metrics of the selected states. The LLR-CU 325 then computes soft-output information (e.g., LLRs), which are used during bit-level decoding.

Aspects of this invention provide quasi-reduced state equalization techniques that apply a detection algorithm on a reduced trellis structure. Quasi-reduced state equalization differs from conventional reduced state equalization in that quasi-reduced state equalization applies state reduction in a non-uniform fashion across units/components of the equalizer, while conventional reduced state equalization applies state reduction uniformly across all components of the equalizer. In one example, quasi-reduced state equalization applies state reduction at the APM level, but not at the BM level.

Figure 4:
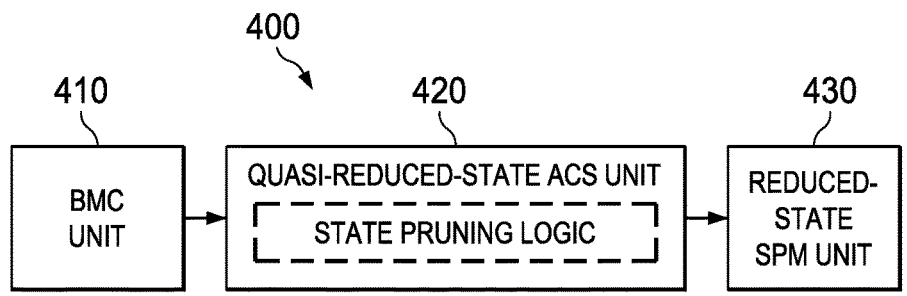
FIG. 4 illustrates a diagram of an embodiment quasi-reduced state equalizer.

FIG. 4 illustrates a diagram of an embodiment quasi-reduced state equalizer 400 configured to apply state reduction at the APM level of ISI equalization. As shown, the quasi-reduced state equalizer 400 includes a BMC unit 410, a quasi-reduced state ACS unit 420, and a reduced-state SPM unit 430. In this example, the BMC unit 410 computes BMs for symbols in a block of symbols, and forwards the BMs to the quasi-reduced state ACS unit 420.

The quasi-reduced state ACS unit 420 computes accumulated path metrics (APMs) for candidates states of a leading symbol based on BMs of those candidate states and, if available, APMs for symbols preceding the leading symbol. The quasi-reduced state ACS unit 420 then selects a subset of APMs to propagate over a trellis to candidate states of a trailing symbol. In some embodiments, the subset of APMs for the leading symbol is selected by state pruning logic in the quasi-reduced state ACS 420. The state pruning logic may include any component (e.g., application-specific integrated circuitry) suitable for selecting APMs.

The subset of APMs may be selected based on which APMs have a shortest Euclidian distance from the corresponding maximum likelihood (ML) point. The ML point for a symbol corresponds to one of the candidate states of the symbol. In some embodiments, the ML point could correspond to the candidate state having the smallest APM or the smallest BM. The subset of APMs of a trailing symbol may also be selected based on a weighted combination of a BM of the corresponding candidate state of the trailing symbol and APMs of leading symbols that are propagated to the corresponding candidate state of the trailing symbol. The ACS unit 410 then computes APMs for candidate states of the trailing symbol based on BMs for those candidate states, as well as on the subset of APMs propagated from the leading symbol. The APMs and the BMs for the current symbol are then stored by the SPM unit, and the process proceeds to the next stage/symbol where APMs are computed for that symbol in a similar fashion. This cycle continues until APMs are computed for each stage of the trellis. After APMs are computed for each symbol in the block of symbols, the quasi-reduced state ACS unit 420 forwards the computed APMs to the reduced-state SPM unit 430, and the values stored in the reduced-state SPM unit 430 are used by decision unit to select the maximum likelihood path/paths over the trellis based on the computed APMs.

It should be appreciated that embodiment quasi-reduced state equalizer 400 may be configured to perform equalization for any sequence of N symbols (where N is an integer greater than or equal to two). It should also be appreciated that the quasi-reduced state ACS 420 may perform state reduction on each of the N symbols, or on fewer than all of the N symbols, e.g., one symbol, a subset of the N symbols. When state reduction is applied to multiple symbols, the same or different numbers of APMs may be selected for propagation over the trellis for different symbols. In one example, state reduction is applied to a leading symbol, but not a trailing symbol. This may strike a balance between processing efficiency and error reduction, as storing APMs for each candidate state of the trailing symbol may reduce the likelihood of errors during path selection, as well as reduce the likelihood of a degenerate LLR condition arising during bit-level decoding of the trailing symbol.

Figure 5:
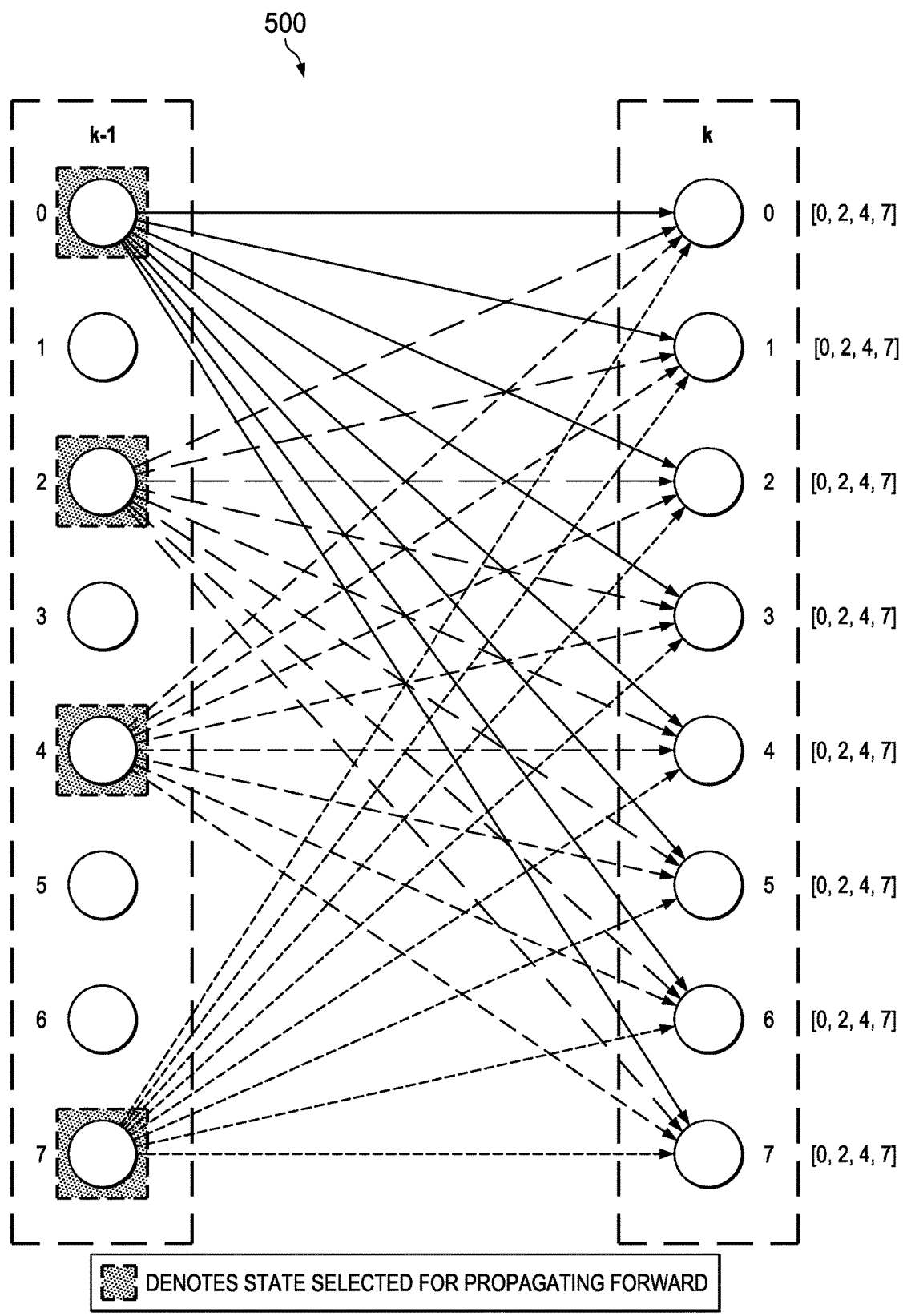
FIG. 5 illustrates a diagram of an embodiment quasi-reduced state trellis.

FIG. 5 illustrates an embodiment quasi-reduced state trellis equalizer 500 configured to evaluate two 8-QAM symbols, namely a leading symbol (k−1) and a trailing symbol (k). Those of ordinary skill in the art will appreciate that the embodiment quasi-reduced state trellis equalizer 500 is just one example of the many embodiments enabled by this disclosure, and that other embodiment quasi-reduced state trellis equalizers may evaluate more symbols/stages (e.g., three or more stages) and/or symbols having different types/orders of modulation, e.g., 16-QAM, 64-QAM, QPSK.

As shown, the quasi-reduced state trellis equalizer 500 selects a subset of APMs for the leading symbol (k−1) to propagate over the trellis to the trailing symbol (k). In this example, the subset of APMs selected to propagate over the trellis include candidates zero, two, four, and seven of the leading symbol (k−1), while candidates one, three, five, and six of the leading symbol (k−1) are excluded from the subset of candidates selected to propagate over the trellis. The candidates may be selected based on one or more selection criteria. In some embodiments, candidate states having a shortest Euclidian distance between the symbol represented by the candidate state and a maximum likelihood (ML) point of a leading symbol are selected to propagate over the trellis to the trailing symbol (k). The subset of APMs are then propagated over the trellis to candidate states of the trailing symbol (k), where the subset of APMs are used to compute APMs for the candidate states of the trailing symbol (k).

The embodiment depicted in FIG. 5 uses an 8-QAM constellation to modulate the leading symbol (k−1) and the trailing symbol (k). When using an 8-QAM constellation for a first-order Markov Channel Model, the states of the trailing symbol (k) are determined only by the states of the immediate leading symbol (k−1). In this model, all candidate states of the trailing symbol (k) are reachable from all candidate states of the leading symbol (k−1) due to the limited effect of the channel memory and the fact that the candidate states are represented by complex symbols. This causes the trellis to be fully connected such that the trellis interconnects each candidate state of the trailing symbol (k) to each candidate state of the leading symbol (k−1), which can be seen in FIG. 5. In other embodiments, higher order constellations (e.g., 16-QAM constellations, 64-QAM constellations) and/or different channel models may result in only a subset of candidate states of a trailing symbol being reachable from a given state of a leading symbol. In such embodiments, a partially connected trellis may be used to perform ISI equalization. Performing state reduction on a leading symbol of a partially connected trellis may reduce the number of APMs that are computed for a trailing symbol. Hence, state reduction may reduce a processing load associated with ISI equalization of symbols modulated using higher order constellations.

Figure 6:
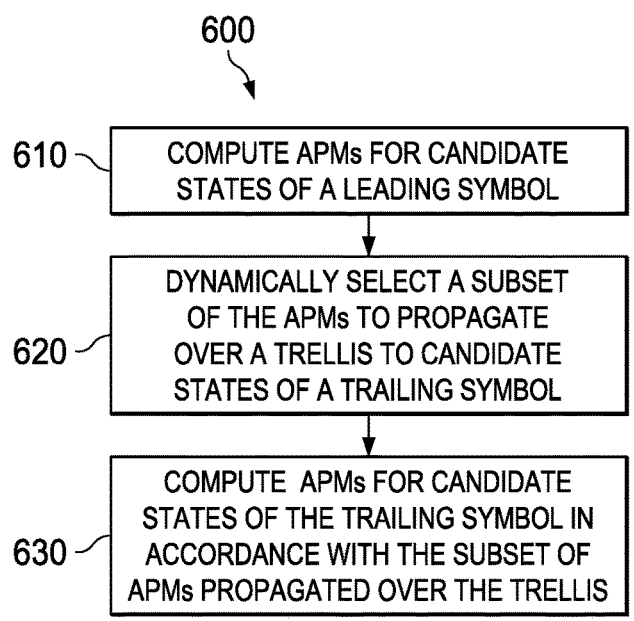
FIG. 6 illustrates a flow chart of an embodiment method for performing quasi-reduced state equalization.

FIG. 6 illustrates a flow chart of an embodiment method 600 for performing quasi-reduced state trellis equalization, as might be performed by a receiver. At step 610, the receiver computes APMs for candidate states of a leading symbol in a sequence of symbols. At step 620, the receiver dynamically selects a subset of the APMs to propagate over a trellis to candidate states of a trailing symbol. At step 630, the receiver computes APMs for candidate states of the trailing symbol in accordance with the subset of APMs propagated over the trellis from the leading symbol.

Figure 7:
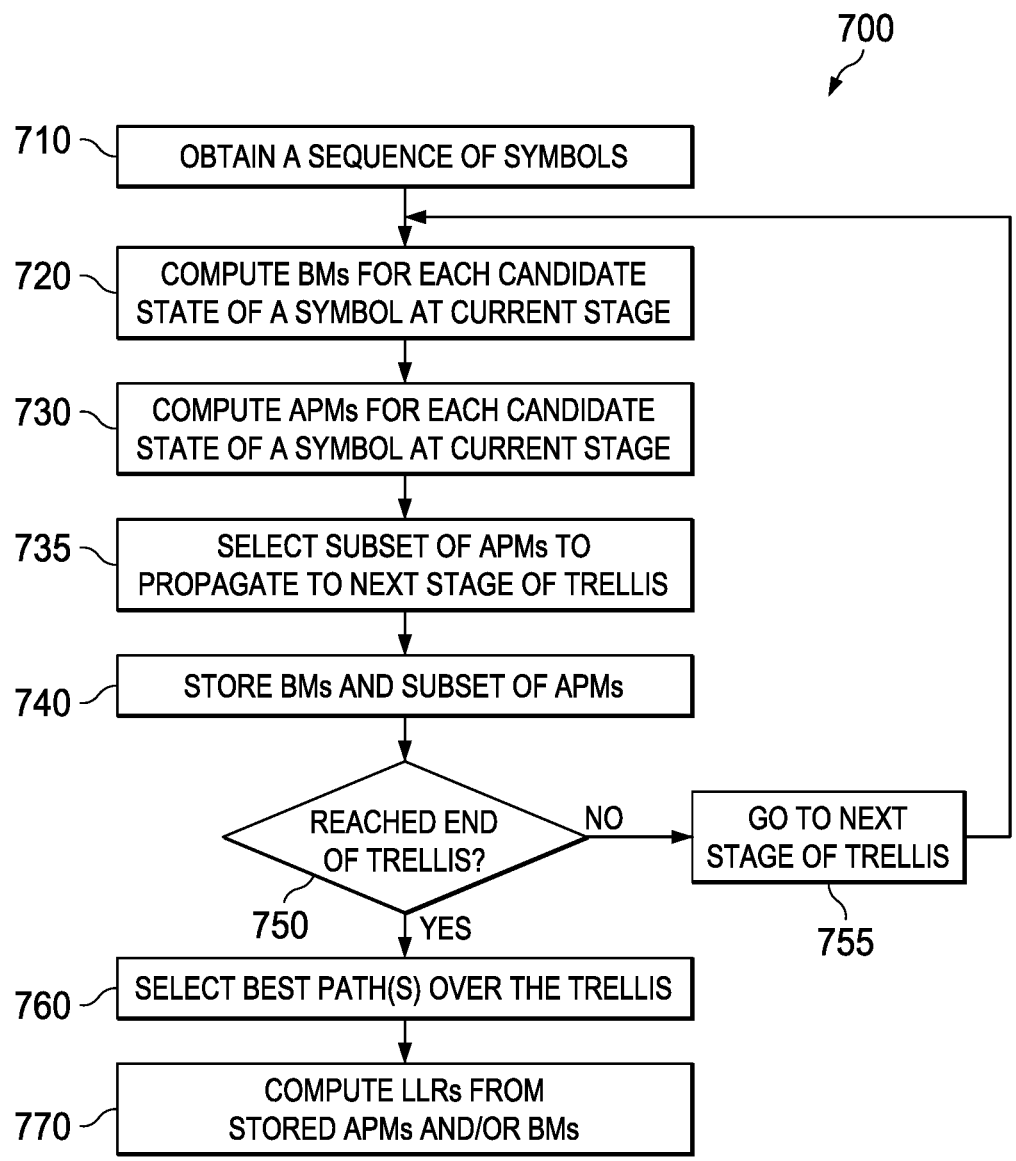
FIG. 7 illustrates a flow chart of another embodiment method for performing quasi-reduced state equalization.

FIG. 7 illustrates a flowchart of another embodiment method 700 for performing quasi-reduced state trellis equalization, as might be performed by a receiver. At step 710, the receiver receives a sequence of symbols. At step 720, the receiver computes BMs for candidate states of each symbol in a sequence of symbols. The BMs for each of candidate state of symbols may be stored in memory so that they are available for soft output computation (at step 770) in the event of a degenerate LLR scenario. At step 730, the receiver computes APMs for each candidate state of a symbol at a current stage of the trellis. At step 735, the receiver selects a subset of the APMs to propagate to the next stage of the trellis. In some embodiments, state reduction is performed at fewer than all stages of the trellis. In such embodiments, all APMs for some symbols are propagated to the next stage of the trellis, while fewer than all APMs for other symbols are propagated to the next stage of the trellis. In other embodiments, state reduction is performed at each stage of the trellis, in which case fewer than all APMs for each symbol are propagated to the next stage of the trellis.

At step 740, the receiver stores the BMs and the subset of APMs for the symbol at the current stage of the trellis in memory. At step 750, the receiver determines whether the last stage of the trellis has been reached. If not, the receiver proceeds to the next stage of the trellis at stage 755, and then reverts back to steps 730-750 until the last stage of the trellis has been reached. At step 760, the receiver selects the best path(s) over the trellis. In some embodiments, a single path is selected. In other embodiment, multiple paths are selected. At step 770, the receiver computes LLRs from stored path metrics and/or BMs.

In some embodiments, LLRs are computed based on the following formula: LLR=sign(HD)*[max(APM(1))−max(APM(0))], where LLR is the LLR for the bit, sign(HD) is positive or negative based on a value of the hard decision for the bit, max (APM(1)) is the highest APM value for candidate states of the leading symbol that map to a value of one for the bit, and max (APM(zero)) is the highest APM value for candidate states of the leading symbol that map to a value of zero for the bit. In other embodiments, LLRs are computed based on the following formula: LLR=sign(HD)*[max(APM(0))−max(APM(1))].

Figure 8:
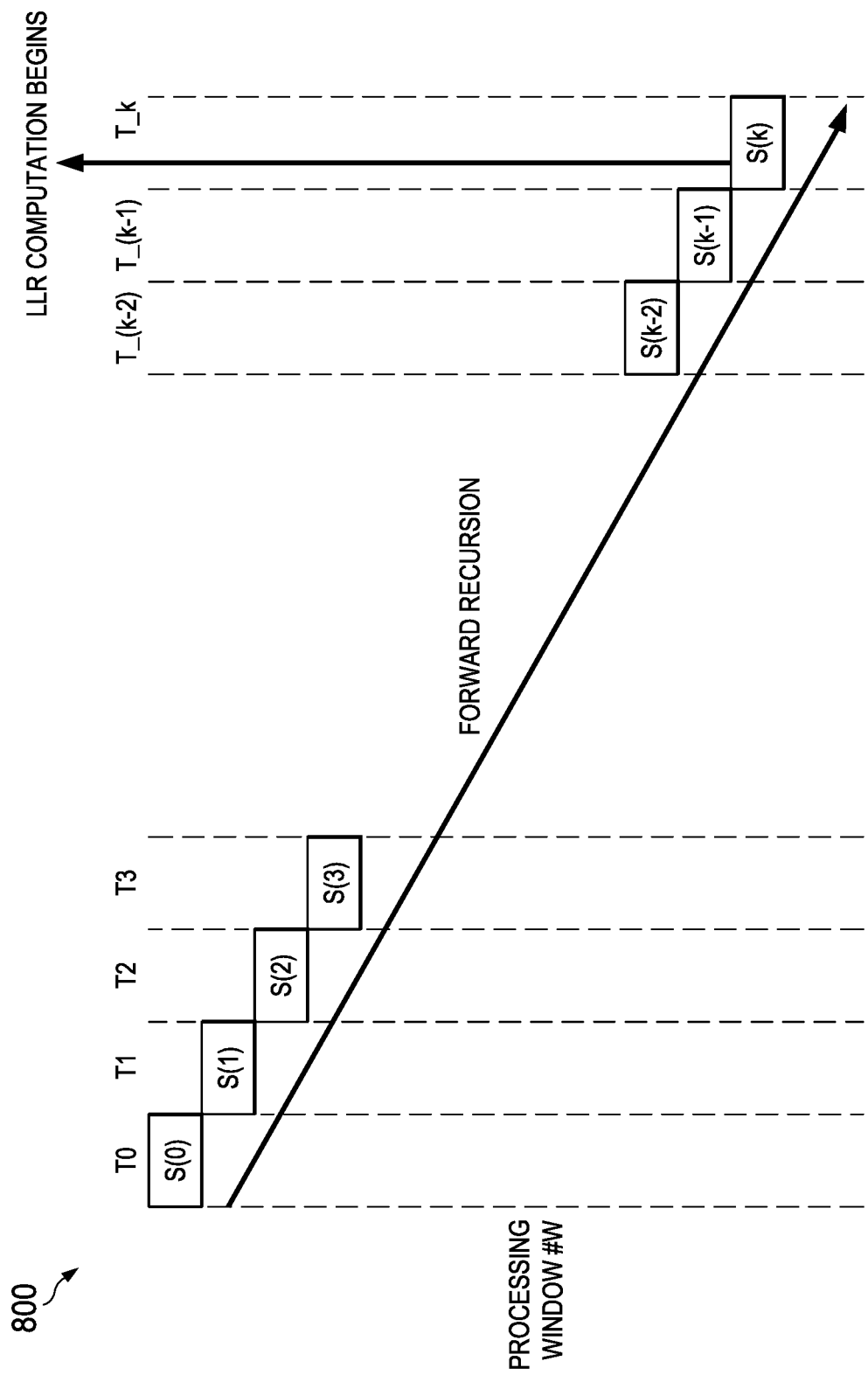
FIG. 8 illustrates a timing diagram for performing quasi-reduced state equalization on a sequence of symbols.

FIG. 8 illustrates a timing diagram Boo for performing quasi-reduced state equalization on a sequence of symbols including symbol 0 through symbol k, where lower-numbered symbols precede higher number symbols (i.e., symbol 0 leads symbol 1, symbol 1 leads symbol 2 . . . , symbol (k−1) leads symbol k). As shown, BM/APMs for the sequence of symbols are computed over T_k periods at the rate of one symbol per period. The rate of one symbol per period is given as an example, and it should be appreciated that other rates are also possible. At the end of each period, the BMs and APMs for the corresponding symbol are stored. The APMs are used for LLR computation during bit-level decoding. The BMs are used for LLR computation during bit-level decoding if a degenerate LLR condition occurs. The vertical axis can roughly be equated to the computation time requirements for a given block of symbols.

Figure 9:
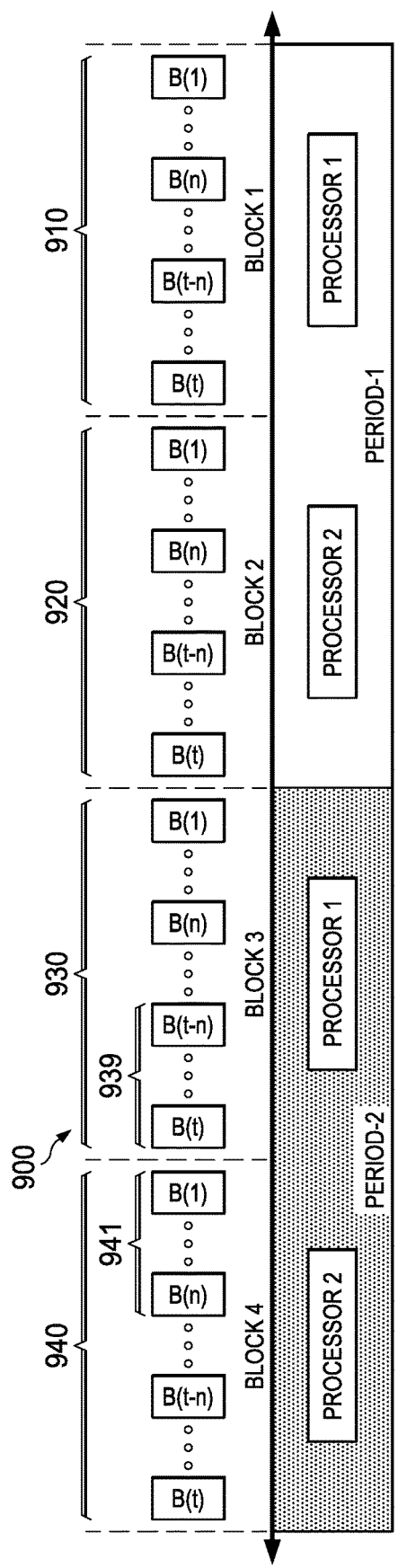
FIG. 9 illustrates a diagram of a conventional sequential processing scheme for performing ISI equalization on a sequence of symbols.

Aspects of this invention further provide embodiment staggered processing techniques for performing ISI equalization on blocks of modulation symbols. Conventional parallel processing schemes perform ISI equalization on blocks in a sequential fashion such that the respective processors perform ISI equalization on consecutive blocks during a given time period. This leads to latency and additional processing at the beginning of each period due to the need for each processor to know values (e.g., BMs, APMs) associated with symbols preceding the first symbol of the block currently being processed. FIG. 9 illustrates a conventional parallel processing scheme for performing ISI equalization on a sequence of symbols 900. As shown, the sequence of symbols 900 is broken up into four blocks 910, 920, 930, 940. The conventional parallel processing scheme assigns the processors to process the blocks of symbols sequentially. In this example, two processors (processor 1 and processor 2) are assigned to process the four blocks 910, 920, 930, 940 over two periods. During the first period, processor 1 performs ISI equalization on block 910 and processor 2 performs ISI equalization on block 920. During the second period, processor 1 performs ISI equalization on block 930 and processor 2 performs ISI equalization on block 940.

Notably, a processor may need to know values (e.g., BMs, APMs) for the last few symbols of a leading block in order to perform ISI equalization on the first few symbols of a trailing block. If a block was not processed during a previous period, then the processor may need to process the last few symbols of the preceding/leading block prior to processing the first few symbols of the current/trailing block.

For example, processor 2 may need to know values for the last few symbols 939 of block 930 prior to processing the first few symbols 941 of block 940 during the second period. In this example, block 930 is not processed until the second period, and therefore values for the last few symbols 939 of block 930 are not known at the beginning of the second period. Accordingly, processor 2 may need to process the last few symbols 939 of block 930 during the second period prior to processing the first few symbols of block 940. This may add latency into processing of the sequence of symbols 900.

Figure 10:
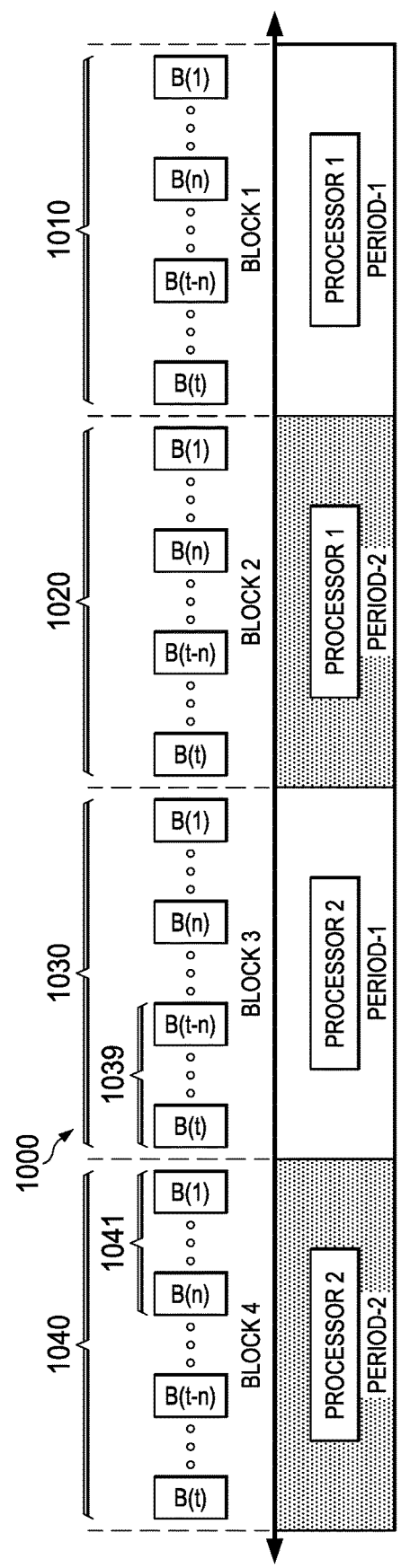
FIG. 10 illustrates a diagram of an embodiment staggered processing scheme for performing ISI equalization on a sequence of symbols.

Aspects of this invention provide embodiment staggered parallel processing schemes that mitigate/avoid much of the aforementioned latency associated with sequential parallel processing techniques of the prior art. FIG. 10 illustrates an embodiment parallel processing technique for performing ISI equalization on a sequence of symbols woo. The sequence of symbols 1000 is broken up into four blocks 1010, 1020, 1030, 1040, and two processors (processor 1 and processor 2) are assigned to process the four blocks

1010, 1020, 1030, 1040 over two periods using a staggered processing scheme. During the first period, processor 1 performs ISI equalization on block 1010 and processor 2 performs ISI equalization on block 1030. During the second period, processor 1 performs ISI equalization on block 1020 and processor 2 performs ISI equalization on block 1040. By virtue of the staggered processing scheme, the last few symbols 1039 of block 1030 are evaluated prior to the second period. This allows processor 2 to begin processing the first few symbols 1041 of the block 1040 at the beginning of the second period, thereby reducing latency and improving processing efficiency.

Figure 11:
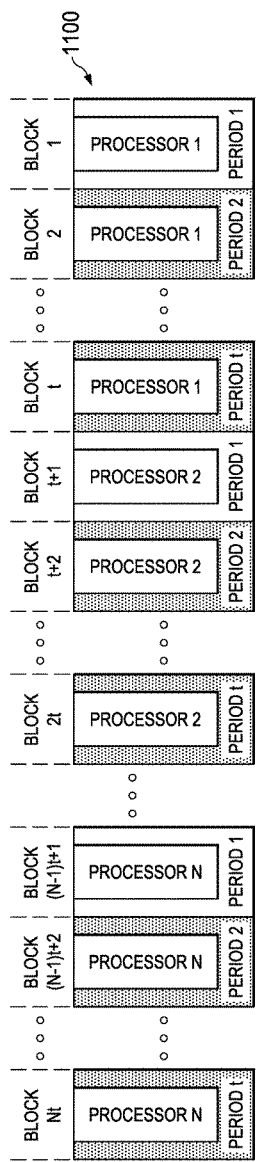
FIG. 11 illustrates a diagram of another embodiment staggered processing scheme for performing ISI equalization on a sequence of symbols.

It should be appreciated that the staggered processing techniques disclosed herein may be applied to a system that includes any number of parallel processors performing ISI equalization on any number of blocks over any number of periods. FIG. 11 illustrates an embodiment parallel processing technique in which N processors (N≥3) performs ISI equalization on a sequence of symbols 1100 over t periods (t≥3). In this example, the sequence of symbols 1100 is broken up into N*t blocks of symbols. The first processor (processor 1) is assigned to process block 1 through block t during the t periods. The second processor (processor 2) is assigned to process block (t+1) through block (2t) during the t periods. The Nth processor is assigned to process block [(N−1)t+1] through block Nt. The staggered processing scheme may avoid additional processing of the last few symbols in the preceding block for processors 2-N during each of the periods 2-t when compared to conventional sequential processing schemes. Thus, the benefits derived from embodiment staggered processing schemes increase with the scale of the parallel processing network.

Figure 12:
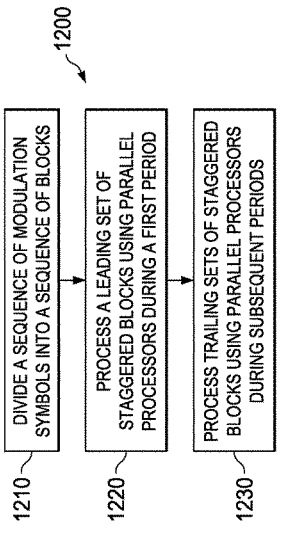
FIG. 12 illustrates a flow chart of an embodiment method for performing ISI equalization using a staggered processing scheme.

FIG. 12 illustrates a method 1200 for performing ISI equalization using a staggered processing technique, as might be performed by a receiver. At step 1210, the receiver divides a sequence of modulation symbols into a sequence of blocks of modulation symbols. At step 1220, the receiver processes a leading block set of staggered blocks (block 1, block (t+1), . . . block [t(N−1)+1]) using parallel processors (processor 1, processor 2, . . . processor N, respectively) during a first period. At step 1230, the receiver processes trailing sets of staggered blocks during subsequent periods. For example, the receiver may process a first trailing set of staggered blocks (block 2, block (t+2), . . . block [t(N−1)+2]) using the parallel processors (processor 1, processor 2, . . . processor N, respectively) during a second period, a second trailing set of staggered blocks (block 3, block (t+3), . . . block [t(N−1)+3]) using the parallel processors (processor 1, processor 2, . . . processor N, respectively) during a third period, and so on and so forth until all blocks have been processed. The amount of staggering between blocks may be selected based on the channel memory and the throughput requirements of the receiver.

Figure 13:
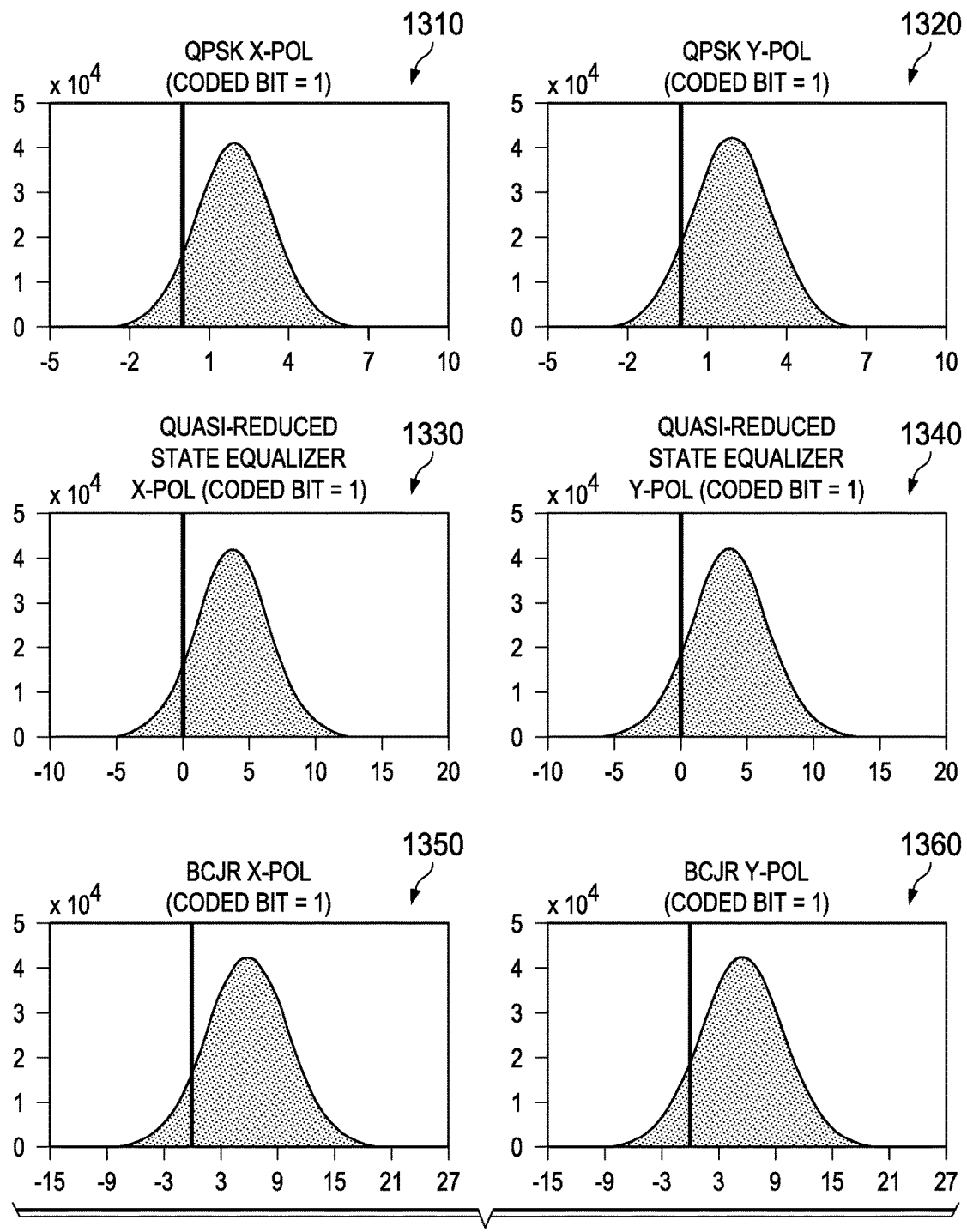
FIG. 13 illustrates a graph of simulation results demonstrating log likelihood ratio (LLR) distributions.

FIG. 13 shows graphs 1310-1360 of simulation results from performing channel equalization on encoded bits transmitted by a dual-polarized coherent optical transceiver. Graphs 1310, 1320 depict LLR distributions for encoded bits received over an ideal channel (i.e., a channel that introduces no ISI into the encoded bits). Graphs 1330, 1340 depict LLR distributions of encoded bits received over a non-ideal channel after applying quasi-reduced state equalization. Graphs 1350, 1360 depict LLR distributions of encoded bits received over a non-ideal channel after applying MAP equalization. The encoded bits in graphs 1310, 1330, 1350 and the encoded bits in graphs 1320, 1340, 1360 are received on mutually orthogonal polarizations denoted by X-polarization and Y-polarization respectively. These simulation results show that embodiment quasi-reduced state equalization schemes produce near Gaussian LLR distributions similar to those obtained under ideal channel conditions as well as those obtained under non-ideal channel conditions with MAP equalization.

Figure 14:
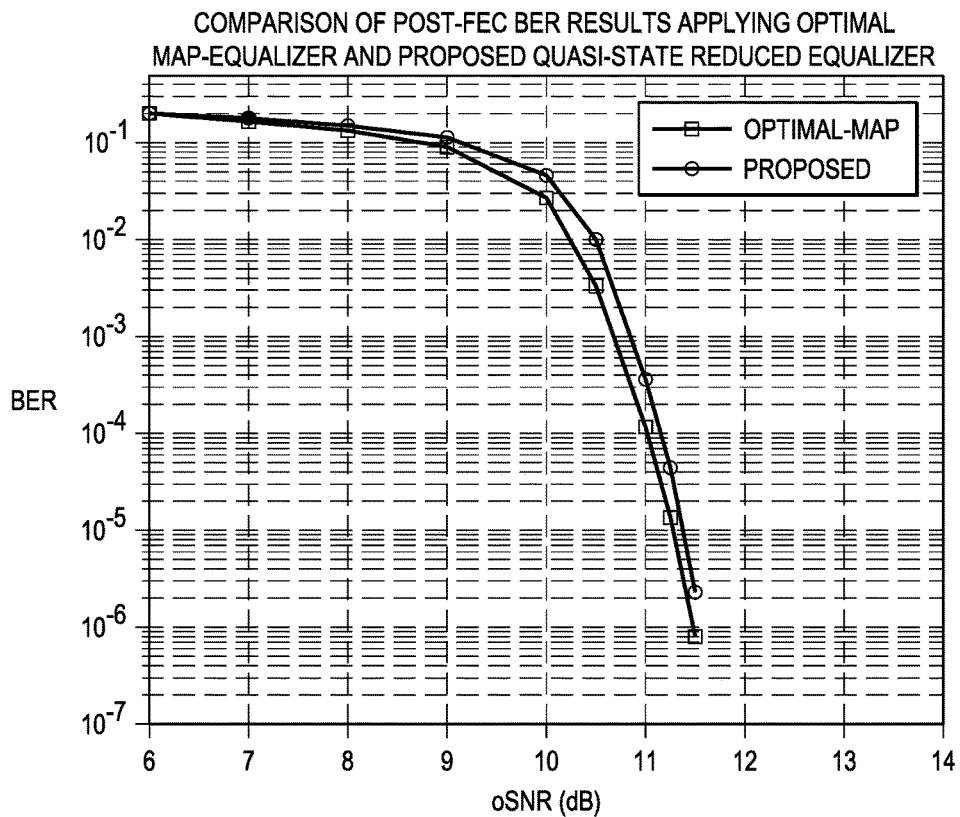
FIG. 14 illustrates a graph of simulation results demonstrating bit error rates (BERs)

FIG. 14 shows simulations results of bit-error rates (BERs) obtained using different trellis equalization techniques. As shown, there is very little BER performance degradation when using quasi-reduced state trellis equalization instead of optimal-MAP equalization.

Two aspects that generally affect the computation complexity of sequence estimation based equalizers are the number of points in the signal constellation and the channel memory. While the latter can be hard to control as it is beyond the system designer to control the specifics of the transmission medium, the candidate states considered can be intelligently selected to limit the overall complexity of the equalization approach. Such intelligence may be gained through feedback based approaches such as decision feedback sequence estimation (DFSE). Unfortunately, DFSE equalizers incur a delay in order to employ decision feedback in trying to reduce the search space for the ML algorithm. For high speed implementations, this delay may be disadvantageous.

Embodiments of this disclosure may utilize an FEC encoder that achieves low error rates at the receiver through the use of iterative decoding techniques. The iterative decoding techniques may exchange extrinsic information between two constituent decoders, such as two constituent FEC decoders either in series or parallel concatenation, e.g., a turbo code. Alternatively, iterative decoding techniques may exchange extrinsic information between various nodes of a Tanner graph representation of a code, such as low density parity check (LDPC) codes. Data bits may be represented by 1s and 0s, that are correspondingly grouped in sets of log 2(M) bits to form a symbol corresponding to a constellation. The symbols of a constellation may be represented by real and imaginary parts on a 2-D plane. Bit to symbol mappings may be performed within a transmitter module. The mapped symbol stream may then be digitally processed within the transmitter such that its properties match the channel. A common operation is to apply pulse-shaping such that the Nyquist criterion is met in an effort to reduce the ISI amongst the transmit pulses. These symbols may be modulated onto an analog waveform through a digital to analog conversion unit (DAC) which may further act as a low-pass filter and add quantization noise onto the transmitted signal. The analog waveform then passes through the channel, which may introduce distortions such that symbols are linearly overlapped. For instance, one symbol may spread over several transmitted symbols depending on the bandwidth of the end-to-end channel and the baud rate of the communication system.

Coherent optical channels may comprise optical amplifiers, optical fiber through which light propagates, and various optical switches and filters that may further introduce some distortion into the transmitted signal depending on the bandwidth. For example, a cascade of similar filters can lead to bandwidth reduction that is exponentially proportional to the number of filters between the source and the destination of the propagated signal. An integrated coherent receiver may generate an electrical domain signal from the impinging optical domain signal. The signal may be digitized using an analog-to-digital converter. The signal may also be filtered upon reception. ISI equalizers may produce soft outputs from a sequence of symbols which are correlated with finite memory T (in terms of number of symbols) such that the current symbol could be affected by up to T leading symbols. Soft output can be obtained using various techniques, such as the Bahl-Cocke-Jelinek-Raviv (BCJR) algorithm that implements the MAP principle and requires a forward as well as backward recursion to compute relevant metrics. After computation of the metrics, the MAP approach can provide the LLRs through a symbol-by-symbol computation. Alternatively, a soft-output detector may implement the soft output Viterbi algorithm (SOVA) that may use forward recursion and follow a path-based computation of the metrics.

Reduced-state trellis equalization may include eliminating a few states in an original trellis through merging some states of the original trellis into one hyper-state or through absolute state truncation, which reduce performance when compared to full-state trellis equalization. One technique for improving the performance of reduced-state trellis equalization is to use decision feedback. However, decision feedback may have some risks from both a performance and implementation perspective. For instance, decision feedback equalization (DFE) may only improve the BER if the starting BER is moderately low. Thus, little or no advantage may be derived from employing DFE on streams having high BERs. Moreover, DFE may increase the overall latency of the DSP implementation, as well as effectively reduce the throughput of the overall MLSE-based equalizer. Furthermore, DFE may prevent the use of high-speed/throughput techniques such as bit-level pipelining.

State reduction may be useful for higher QAM transmission modes to reduce resource consumption, e.g., number of gates, power consumption. Quasi-reduced state equalization occurs when state reduction is not applied uniformly to all components of a trellis equalizer. Traditional reduced state detection algorithms maintain a feedback loop with a certain depth such that the accuracy of the branch metric computation is improved by using decisions from the preceding t symbols (where t is a function of channel memory). In an embodiment, t is an integer multiple of channel memory. In such cases, the decision feedback loop becomes the critical path of the ACS processing pipeline and prevents the use of high-speed techniques such as bit-level pipelining. Embodiment quasi-reduced state equalization techniques may be implemented without relying on decision feedback, and can therefore be applied with high-speed techniques, e.g., bit-level pipelining.

Embodiments quasi-reduced state equalization techniques may be used to process complex baseband symbols. These techniques may be performed after control functions such as symbol timing recovery and automatic gain adjustment. The embodiment techniques may compute a branch metric for each given state of the trellis. The number of states in a complex trellis may be expressed as $F=S^{CM}$, where CM denotes the channel memory, and S is the number of candidate states for a given stage of the trellis. In a complex trellis (a trellis considering real and imaginary parts together), S is equal to the number of symbols in the constellation (e.g., S is 8 for 8-QAM). If considering a real or imaginary trellis (real and imaginary parts may be separated without any dependency), then S is equal to the square root of the number of symbols in the constellation where M denotes the number of symbols in the constellation (e.g., for 16-QAM, S is equal to sqrt(16) for the trellis corresponding to the real part and for the trellis corresponding to the imaginary part). In some embodiments, a channel is considered to be 1st order Markov. A 1st order Markov channel may be considered Markov-Gaussian when it is affected by a threshold amount of Gaussian noise. A trellis for a 1st order Markov channel (or a 1st order Markov-Gaussian channel) may be expressed as $[(F=\{2\})^{\{(\{log\_2(S)/2\}*CM)\}}]$. By processing the real and imaginary components separately in case of 16-QAM, it is possible to obtain a 16-state trellis for a 16-QAM symbol when considering CM=1. Branch metrics are computed for all states of the trellis. The ACS units maintain the APMs for only N selected states (where N<F), and the F−N non-selected states are discarded based on a state-pruning logic. The state-pruning logic can have any implementation including those that are dependent on decision feedback. Quasi-reduced state equalization may have several advantages over conventional trellis reduction. One advantage is that quasi-reduced state equalization avoids the t-delay decision feedback incurred by conventional trellis reduction. Avoiding this delay helps provide high throughput. Another advantage is that quasi-reduced state equalization does not require a state reduction interface (SRI) block to manage the trellis size difference between the ACS and SPMU. Instead, embodiment quasi-reduced state equalization techniques allow the ACSU to manage the trellis size difference through an implicit state selection embedded in the trellis traversal.

Aspects of this invention provide staggered processing techniques that mitigate overhead when performing ISI equalization using parallel processors. A sequence of symbols may be broken down into blocks of symbols for parallelized processing. However, since the actual channel is continuous, such parallelization may need to take into account channel continuity by processing the last L symbols from the previous block prior to processing the current block. This leads to an additional L symbols of processing overhead. In order to avoid this delay, embodiments of this disclosure introduce the concept of staggered processing, where a delay of K symbols is applied in processing of subsequent blocks such that Block N+1 is processed after K symbols from Block N have been processed (where each block has no more than K symbols). Thus, Block N+1 can be initialized appropriately with the metrics from Block N.

Aspects of this invention may improve the accuracy of soft values generated by a reduced state equalizer. With trellis state-reduction, the accuracy of the soft values may be directly proportional to the number of paths considered when no additional information is used to post-process the soft information before providing them as input to the FEC decoder. The accuracy may also decrease when fewer paths are selected. The symbols corresponding to the ML and non-ML path may coincide, giving rise to a degenerate case (LLR=∞). The following policy is further applied for LLR generation. If ML symbol=Non-ML symbol, LLR=sign (HD)*{max (APM_S_b^1)−max(APM_S_b^0)}, where HD denotes hard decision, ML symbol is the symbol from the most likely path as per the decision made at $T_o+K$ and Non-ML symbol is the symbol chosen as per the path that is ranked second at $T_o+K$ in terms of APM.

It should be noted that the various functionalities presented herein for the quasi-state reduced trellis equalizer with soft output capability can be provided to through the use of dedicated hardware such as with an ASIC as well as using an off-the-shelf DSP processor, which for the current generation of processors may implement the individual functionalities through a single high-performance processor or may distribute the functionality to several inter-connected processors that are able to process the same input data stream. Such processors are differently referred in technical literature as digital signal processors (DSPs) or field programmable gate arrays (FPGAs), each of which may store the functionality through the use of read-only memory (ROM) that may or may not be on the same processor.

Figure 15:
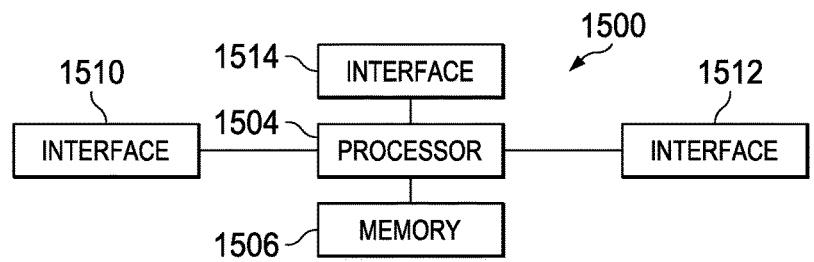
FIG. 15 illustrates a block diagram of an embodiment processing system.

FIG. 15 illustrates a block diagram of an embodiment processing system 1500 for performing methods described herein, which may be installed in a host device. As shown, the processing system 1500 includes a processor 1504, a memory 1506, and interfaces 1510-1514, which may (or may not) be arranged as shown in FIG. 15. The processor 1504 may be any component or collection of components adapted to perform computations and/or other processing related tasks, and the memory 1506 may be any component or collection of components adapted to store programming and/or instructions for execution by the processor 1504. In an embodiment, the memory 1506 includes a non-transitory computer readable medium. The interfaces 1510, 1512, 1514 may be any component or collection of components that allow the processing system 1500 to communicate with other devices/components and/or a user. For example, one or more of the interfaces 1510, 1512, 1514 may be adapted to communicate data, control, or management messages from the processor 1504 to applications installed on the host device and/or a remote device. As another example, one or more of the interfaces 1510, 1512, 1514 may be adapted to allow a user or user device (e.g., personal computer (PC)) to interact/communicate with the processing system 1500. The processing system 1500 may include additional components not depicted in FIG. 15, such as long term storage (e.g., non-volatile memory).

In some embodiments, the processing system 1500 is included in a network device that is accessing, or part otherwise of, a telecommunications network. In one example, the processing system 1500 is in a network-side device in a wireless or wireline telecommunications network, such as a base station, a relay station, a scheduler, a controller, a gateway, a router, an applications server, or any other device in the telecommunications network. In other embodiments, the processing system 1500 is in a user-side device accessing a wireless or wireline telecommunications network, such as a mobile station, a user equipment (UE), a personal computer (PC), a tablet, a wearable communications device (e.g., a smartwatch), or any other device adapted to access a telecommunications network.

Figure 16:
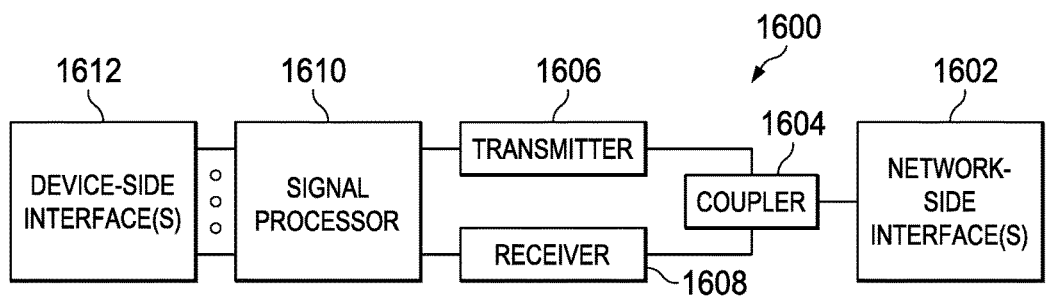
FIG. 16 illustrates a block diagram of an embodiment transceiver.

In some embodiments, one or more of the interfaces 1510, 1512, 1514 connects the processing system 1500 to a transceiver adapted to transmit and receive signaling over the telecommunications network. FIG. 16 illustrates a block diagram of a transceiver 1600 adapted to transmit and receive signaling over a telecommunications network. The transceiver 1600 may be installed in a host device. As shown, the transceiver 1600 comprises a network-side interface 1602, a coupler 1604, a transmitter 1606, a receiver 1608, a signal processor 1610, and a device-side interface 1612. The network-side interface 1602 may include any component or collection of components adapted to transmit or receive signaling over a wireless or wireline telecommunications network. The coupler 1604 may include any component or collection of components adapted to facilitate bi-directional communication over the network-side interface 1602. The transmitter 1606 may include any component or collection of components (e.g., up-converter, power amplifier) adapted to convert a baseband signal into a modulated carrier signal suitable for transmission over the network-side interface 1602. The receiver 1608 may include any component or collection of components (e.g., down-converter, low noise amplifier) adapted to convert a carrier signal received over the network-side interface 1602 into a baseband signal. The signal processor 1610 may include any component or collection of components adapted to convert a baseband signal into a data signal suitable for communication over the device-side interface(s) 1612, or vice-versa. The device-side interface(s) 1612 may include any component or collection of components adapted to communicate data-signals between the signal processor 1610 and components within the host device (e.g., the processing system 1500, local area network (LAN) ports).

The transceiver 1600 may transmit and receive signaling over any type of communications medium. In some embodiments, the transceiver 1600 transmits and receives signaling over a wireless medium. For example, the transceiver 1600 may be a wireless transceiver adapted to communicate in accordance with a wireless telecommunications protocol, such as a cellular protocol (e.g., long-term evolution (LTE)), a wireless local area network (WLAN) protocol (e.g., Wi-Fi), or any other type of wireless protocol (e.g., Bluetooth, near field communication (NFC)). In such embodiments, the network-side interface 1602 comprises one or more antenna/radiating elements. For example, the network-side interface 1602 may include a single antenna, multiple separate antennas, or a multi-antenna array configured for multi-layer communication, e.g., single input multiple output (SIMO), multiple input single output (MISO), multiple input multiple output (MIMO). In other embodiments, the transceiver 1600 transmits and receives signaling over a wireline medium, e.g., twisted-pair cable, coaxial cable, optical fiber. Specific processing systems and/or transceivers may utilize all of the components shown, or only a subset of the components, and levels of integration may vary from device to device.

What is claimed is:

1. A method for staggered processing of modulated symbols, the method comprising:
   dividing a sequence of modulated symbols into a sequence of blocks, wherein the sequence of blocks includes a leading block immediately preceding a trailing block;
   processing, via parallel processors, a first set of staggered blocks during a first processing period, the first set of staggered blocks including the leading block and excluding the trailing block; and
   processing, via the parallel processors, a second set of staggered blocks during a second processing period, the second set of staggered blocks including the trailing block and excluding the leading block, wherein a single one of the parallel processors processes both the leading block during the first processing period and the trailing block during the second processing period.

2. The method of claim 1, wherein one or more symbols of the leading block are processed during the first processing period, and wherein processing the second set of staggered blocks during the second processing period comprises using, via the single parallel processor, the one or more symbols of the leading block to process at least a first symbol in the trailing block during the second processing period.

3. The method of claim 2, wherein the one or more symbols of the leading block comprises a continuous set of symbols preceding the first symbol of the trailing block.

4. The method of claim 1, wherein the first processing period immediately precedes the second processing period.

5. The method of claim 1, wherein processing the first set of staggered blocks during the first processing period comprises processing, via the single parallel processor, a last one or more symbols in the leading block to obtain a processing result.

6. The method of claim 5, wherein processing the second set of staggered blocks during the second processing period comprises performing, via the single parallel processor, inter-symbol interference (ISI) equalization on a first symbol in the trailing block during the second processing period according to a processing result obtained from processing the last one or more symbols in the leading block during the first processing period.

7. The method of claim 6, wherein the last one or more symbols in the leading block are contiguous with the first symbol in the trailing block.

8. An apparatus comprising:
a processor; and
a computer readable storage medium storing programming for execution by the processor, the programming including instructions to:
divide a sequence of modulated symbols into a sequence of blocks, wherein the sequence of blocks includes a leading block immediately preceding a trailing block;
process, via parallel processors, a first set of staggered blocks during a first processing period, the first set of staggered blocks including the leading block and excluding the trailing block; and
process, via the parallel processors, a second set of staggered blocks during a second processing period, the second set of staggered blocks including the trailing block and excluding the leading block, wherein a single one of the parallel processors processes both the leading block during the first processing period and the trailing block during the second processing period.

9. The apparatus of claim 8, wherein one or more symbols of the leading block are processed during the first processing period, and wherein the instructions to process the second set of staggered blocks during the second processing period include instructions to use, via the single parallel processor, the one or more symbols of the leading block to process at least a first symbol in the trailing block during the second processing period.

10. The apparatus of claim 9, wherein the one or more symbols of the leading block comprises a continuous set of symbols preceding the first symbol of the trailing block.

11. The apparatus of claim 8, wherein the first processing period immediately precedes the second processing period.

12. The apparatus of claim 8, wherein the instructions to process the first set of staggered blocks during the first processing period include instructions to process, via the single parallel processor, a last one or more symbols in the leading block to obtain a processing result.

13. The apparatus of claim 12, wherein processing the second set of staggered blocks during the second processing period comprises performing, via the single parallel processor, inter-symbol interference (ISI) equalization on a first symbol in the trailing block during the second processing period according to a processing result obtained from processing the last one or more symbols in the leading block during the first processing period.

14. The apparatus of claim 13, wherein the last one or more symbols in the leading block are contiguous with the first symbol in the trailing block.

15. A computer program product comprising a non-transitory computer readable storage medium storing programming, the programming including instructions to:
divide a sequence of modulated symbols into a sequence of blocks, wherein the sequence of blocks includes a leading block immediately preceding a trailing block;
process, via parallel processors, a first set of staggered blocks during a first processing period, the first set of staggered blocks including the leading block and excluding the trailing block; and
process, via the parallel processors, a second set of staggered blocks during a second processing period, the second set of staggered blocks including the trailing block and excluding the leading block, wherein a single one of the parallel processors processes both the leading block during the first processing period and the trailing block during the second processing period.

16. The computer program product of claim 15, wherein one or more symbols of the leading block are processed during the first processing period, and wherein the instructions to process the second set of staggered blocks during the second processing period include instructions to use, via the single parallel processor, the one or more symbols of the leading block to process at least a first symbol in the trailing block during the second processing period.

17. The computer program product of claim 16, wherein the one or more symbols of the leading block comprises a continuous set of symbols preceding the first symbol of the trailing block.

18. The computer program product of claim 15, wherein the first processing period immediately precedes the second processing period.

19. The computer program product of claim 15, wherein the instructions to process the first set of staggered blocks during the first processing period include instructions to process, via the single parallel processor, a last one or more symbols in the leading block to obtain a processing result.

20. The computer program product of claim 19, wherein processing the second set of staggered blocks during a second processing period comprises performing, via the single parallel processor, inter-symbol interference (ISI) equalization on a first symbol in the trailing block during the second processing period according to a processing result obtained from processing the last one or more symbols in the leading block during the first processing period, and wherein the last one or more symbols in the leading block are contiguous with the first symbol in the trailing block.

* * * * *